(12) United States Patent
Hennessy et al.

(10) Patent No.: US 10,363,480 B2
(45) Date of Patent: *Jul. 30, 2019

(54) GAMING MACHINE WITH A CURVED DISPLAY

(71) Applicant: Video Gaming Technologies, Inc., Franklin, TN (US)

(72) Inventors: Edward Hennessy, Franklin, TN (US); Ryan Cuddy, Franklin, TN (US); Jason Todd Sprinkle, Pauline, SC (US); Paul W. Mellender, Reno, NV (US)

(73) Assignee: Video Gaming Technologies, Inc., Franklin, TN (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/333,614

(22) Filed: Oct. 25, 2016

(65) Prior Publication Data

US 2017/0036107 A1 Feb. 9, 2017

Related U.S. Application Data

(63) Continuation-in-part of application No. 14/145,752, filed on Dec. 31, 2013, now Pat. No. 9,478,097.

(51) Int. Cl.
| | | |
|---|---|---|
| *A63F 13/00* | (2014.01) | |
| *A63F 13/26* | (2014.01) | |
| *A63F 13/2145* | (2014.01) | |
| *A63F 13/35* | (2014.01) | |
| *G07F 17/32* | (2006.01) | |

(52) U.S. Cl.
CPC .......... *A63F 13/26* (2014.09); *A63F 13/2145* (2014.09); *A63F 13/35* (2014.09); *G07F 17/3211* (2013.01)

(58) Field of Classification Search
USPC ...................................... 463/16–25
See application file for complete search history.

(56) References Cited

U.S. PATENT DOCUMENTS

| | | | | |
|---|---|---|---|---|
| 5,722,891 A | * | 3/1998 | Inoue ............... | G07F 17/34 |
| | | | | 273/143 R |
| 7,654,899 B2 | * | 2/2010 | Durham ............ | G07F 17/3202 |
| | | | | 312/7.2 |

(Continued)

FOREIGN PATENT DOCUMENTS

JP          2003038843 A     2/2003

OTHER PUBLICATIONS

Cereal Marshmallows Video; Slot "Jackpot" Wheel of Fortune Machine Slots Winner Progressive Win Cash Reno Siena Casino; available at https://www.youtube.com/watch?v=OXcBXQ9G8UI; last visited May 18, 2015.

(Continued)

*Primary Examiner* — Masud Ahmed
(74) *Attorney, Agent, or Firm* — Armstrong Teasdale LLP

(57) ABSTRACT

A gaming machine that includes a cabinet, a peripheral device coupled to the cabinet, a curved video display, and a processor is provided. The curved video display includes an edge surface of the curved video display that is in contact with the peripheral device. The gaming machine includes a processor that programmed to display, on the curved video display, a graphic adjacent to and associated with the peripheral device.

22 Claims, 6 Drawing Sheets

(56) References Cited

U.S. PATENT DOCUMENTS

| | | | | |
|---|---|---|---|---|
| 7,677,969 B2* | 3/2010 | Rist | ........................... | G07D 7/00 |
| | | | | 194/200 |
| 7,811,170 B2* | 10/2010 | Winans | ................... | G07F 17/32 |
| | | | | 345/30 |
| 8,262,480 B2* | 9/2012 | Cohen | .................... | G07F 17/32 |
| | | | | 200/422 |
| 8,974,297 B2* | 3/2015 | Massing | ............. | G07F 17/3213 |
| | | | | 463/31 |
| 9,171,418 B2* | 10/2015 | Loose | ................. | G07F 17/3211 |
| 2005/0049028 A1 | 3/2005 | Gornez et al. | | |
| 2008/0132332 A1 | 6/2008 | Pryor | | |
| 2009/0036208 A1 | 2/2009 | Pennington et al. | | |
| 2009/0069069 A1 | 3/2009 | Crowder, Jr. et al. | | |
| 2010/0124982 A1 | 5/2010 | Stewart et al. | | |
| 2010/0321287 A1* | 12/2010 | Hine | ....................... | A63F 13/24 |
| | | | | 345/156 |
| 2011/0003630 A1* | 1/2011 | Rasmussen | ............. | G07F 17/32 |
| | | | | 463/20 |
| 2012/0004030 A1* | 1/2012 | Kelly | ................. | G07F 17/3211 |
| | | | | 463/31 |
| 2013/0040731 A1* | 2/2013 | Bernard | ............. | G07F 17/3211 |
| | | | | 463/30 |

OTHER PUBLICATIONS

PCT International Search Report for related matter PCT/US2014/072730 dated Apr. 29, 2015; 11 pp.

* cited by examiner (PRIOR ART)

(PRIOR ART)

GAMING MACHINE WITH A CURVED DISPLAY

CROSS REFERENCE TO RELATED APPLICATIONS

This application is a continuation-in-part of U.S. patent application Ser No. 14/145,752, filed on Dec. 31, 2013, and now issued as U.S. Pat. No. 9,478,097 the content of which is incorporated herein in its entirety.

BACKGROUND OF THE INVENTION

The embodiments described herein relate generally to gaming machines and, more particularly, to systems and methods for providing a game of chance on a curved video display.

Conventional gaming machines include one or more displays, such as a CRT, LCD, or touch screen displays. With advances in graphics processing capabilities of gaming machines, multiple video displays are becoming more common. These multiple video displays typically include a main game display, a secondary display and a player interface that enables the player to communicate with the gaming machine. The player interface is usually located on the main game display or coupled to the front of a cabinet of the gaming machine. Through the use of the player interface, the player can make wagers, enable pay lines, cash-out accumulated credits, prompt a play of the game or make inter-game selections. Gaming machines also include bill/card/voucher acceptors for accepting and/or validating cash bills, coupons, and ticket vouchers. These bill/card/voucher acceptors may also be enabled to accept player identification cards used in rewards/loyalty programs through which players are enrolled to obtain promotions. These promotions may be things such as gifts, meals or cash back to the player based upon the players wagering activities tracked via presentment of the player identification card.

With multiple displays on a gaming machine, each display is separately configured, wired, and controlled. Thus, it is difficult to render a unified image across two or more displays which are separated or divided by a physical barrier between them. However, using a single, large LCD display presents issues regarding placement and tilting of the display, for example, while accommodating a touch screen or gesture based player interface and at the same time providing a unified view. The large display is flat and must be arranged to present touch screen buttons for use by the player at the lower extremity while at the same time positioning the top of the display at a location that is easily viewed by the player. For example, the content for a large video display may require a player to constantly re-focus between the content at the top of the display which is further away versus the content which is nearer at the middle and bottom of the display, which may lead to additional fatigue of the player. Thus, to avoid player fatigue, this arrangement results in a compromise, separate displays, and/or a horizontally arranged player interface/button deck.

BRIEF DESCRIPTION OF THE INVENTION

In one aspect, a gaming machine is provided. The gaming machine includes a cabinet, a peripheral device coupled to the cabinet, a curved video display comprising a cutout, a perimeter of the cutout surrounding the peripheral device, and a processor programmed to display, on the curved video display, a graphic adjacent to and associated with the peripheral device.

In another aspect, a curved video display is provided. The curved video display includes a first display portion, a cutout, and a second display portion, wherein the first display portion defines a main display for displaying a game of chance thereon, wherein a perimeter of the cut is configured to surround a peripheral device coupled to a cabinet of a gaming machine, and wherein the second display portion enables graphics associated with the peripheral device to be presented adjacent to the peripheral device.

In yet another aspect, a method for providing a game of chance on gaming machine that includes a curved video display is provided. The curved video display includes a physical cutout surrounding a peripheral device coupled to a cabinet of the gaming machine. The method includes displaying, on a portion of the curved video display adjacent to the cutout, a first graphic prior to an activation of the peripheral device, identifying a triggering event that activates the peripheral device, and displaying, on the portion of the curved video display adjacent to the cutout, a second graphic after the peripheral device is activated.

DETAILED DESCRIPTION OF THE INVENTION

Exemplary embodiments of systems and methods for use in enabling a game of chance to be displayed on a curved video display are described herein. Such embodiments provide a monolithic, integrated display panel that enables dynamic edge-to-edge graphics that flow around peripheral device to be achieved.

Exemplary technical effects of systems and methods described herein include at least one of: (a) displaying, on a portion of a curved video display adjacent to a cutout surrounding a peripheral device coupled to a cabinet of a gaming machine, a first graphic prior to an activation of the peripheral device; (b) identifying a triggering event that activates the peripheral device; and (c) displaying, on the portion of the curved video display adjacent to the cutout, a second graphic after the peripheral device is activated.

Figure 1:
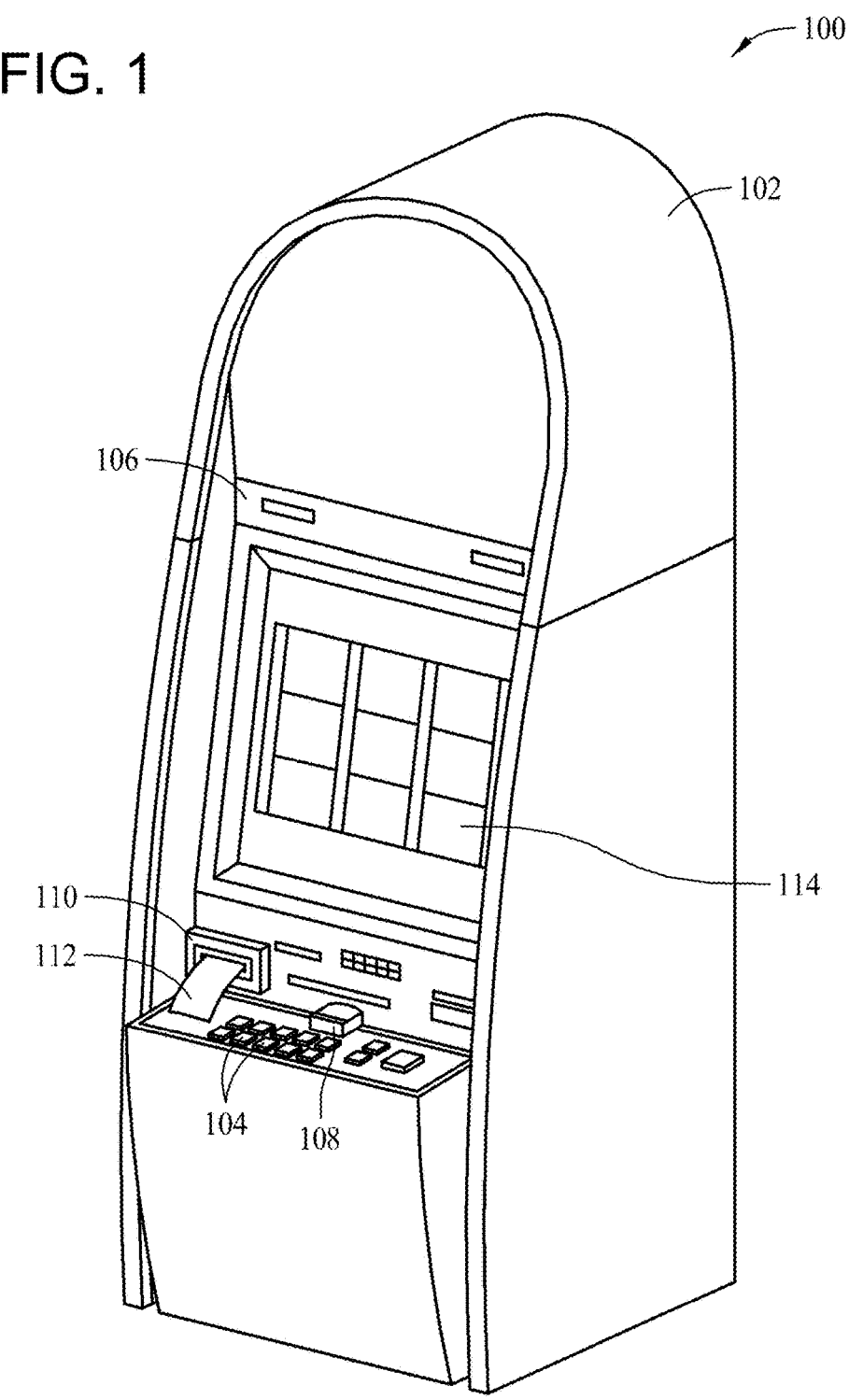
FIG. 1 is a schematic diagram of an exemplary gaming machine according to the prior art.

With reference to FIG. 1, a prior art gaming machine 100 is shown. Gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

As shown in FIG. 1, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing and accepting tickets 112 (e.g., ticket vouchers). Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used.

Gaming machine 100 further includes a video display 114 mounted to be substantially vertical within cabinet 102. Video display 114 may include a plasma display, a liquid crystal display (LCD), a display based on light emitting diodes (LEDs), organic light emitting diodes (OLEDs), polymer light emitting diodes (PLEDs), and/or surface-conduction electron emitters (SEDs). Contained within cabinet 102 is a game controller (not shown) that controls video display 114 to display game content.

Figure 2:
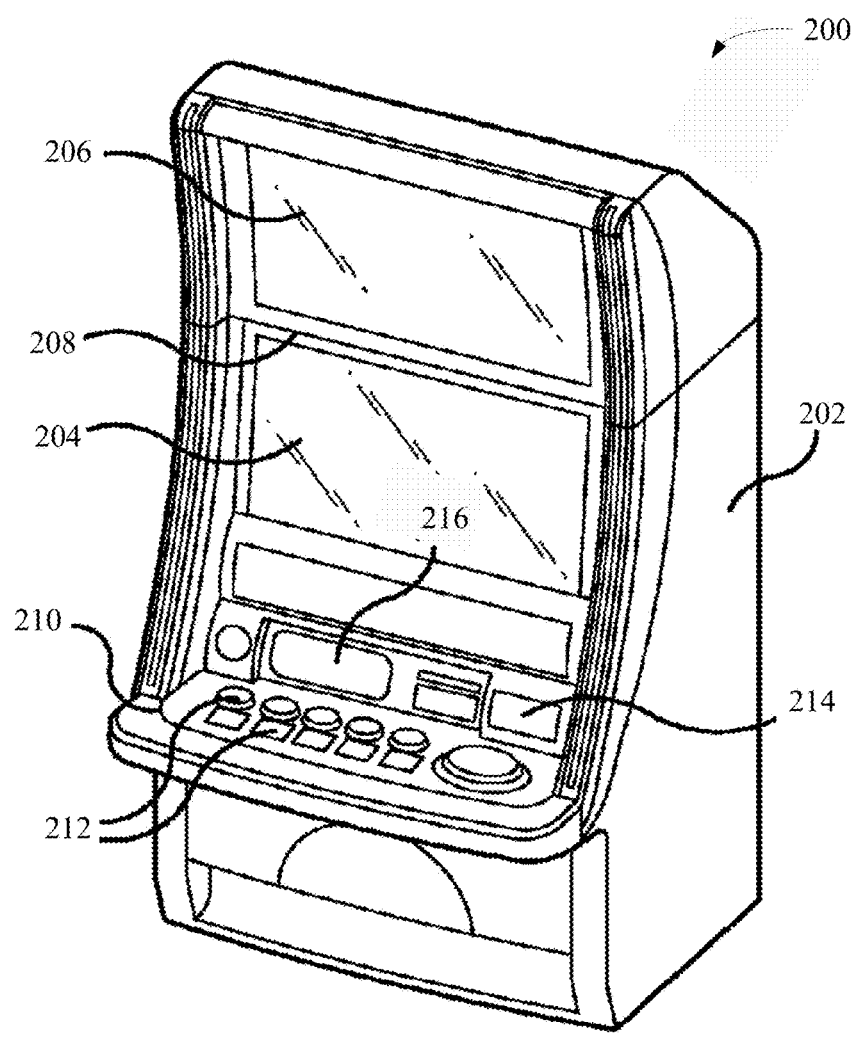
FIG. 2 is schematic diagram of another exemplary gaming machine according to the prior art.

With reference now to FIG. 2, another prior art gaming machine 200 is shown. Gaming machine 200 includes a cabinet 202 mounting a main video display 204 shown as a flat screen LCD, plasma, or touch screen display. Above main video display 204 is a secondary video display 206, which likewise is a flat screen LCD or plasma display. A mounting bezel 208 divides main display 204 from secondary display 206. A player interface, shown as a button panel 210, mounts a plurality of input buttons 212 through which a player controls an operation of a game. Below main video display 204 is an interface module 214 for interfacing with gaming machine 200, and a system interface display 216 for displaying system provided information (e.g., casino wide information and player points/comp data) to a player.

However, the arrangements of the video displays shown in FIGS. 1 and 2 result in certain drawbacks such as expense of providing multiple displays, separate wiring and harnessing, as well as the problem of providing the display of content to the player with large LCD/plasma displays without causing player fatigue or compromising the playing experience.

Figure 3:
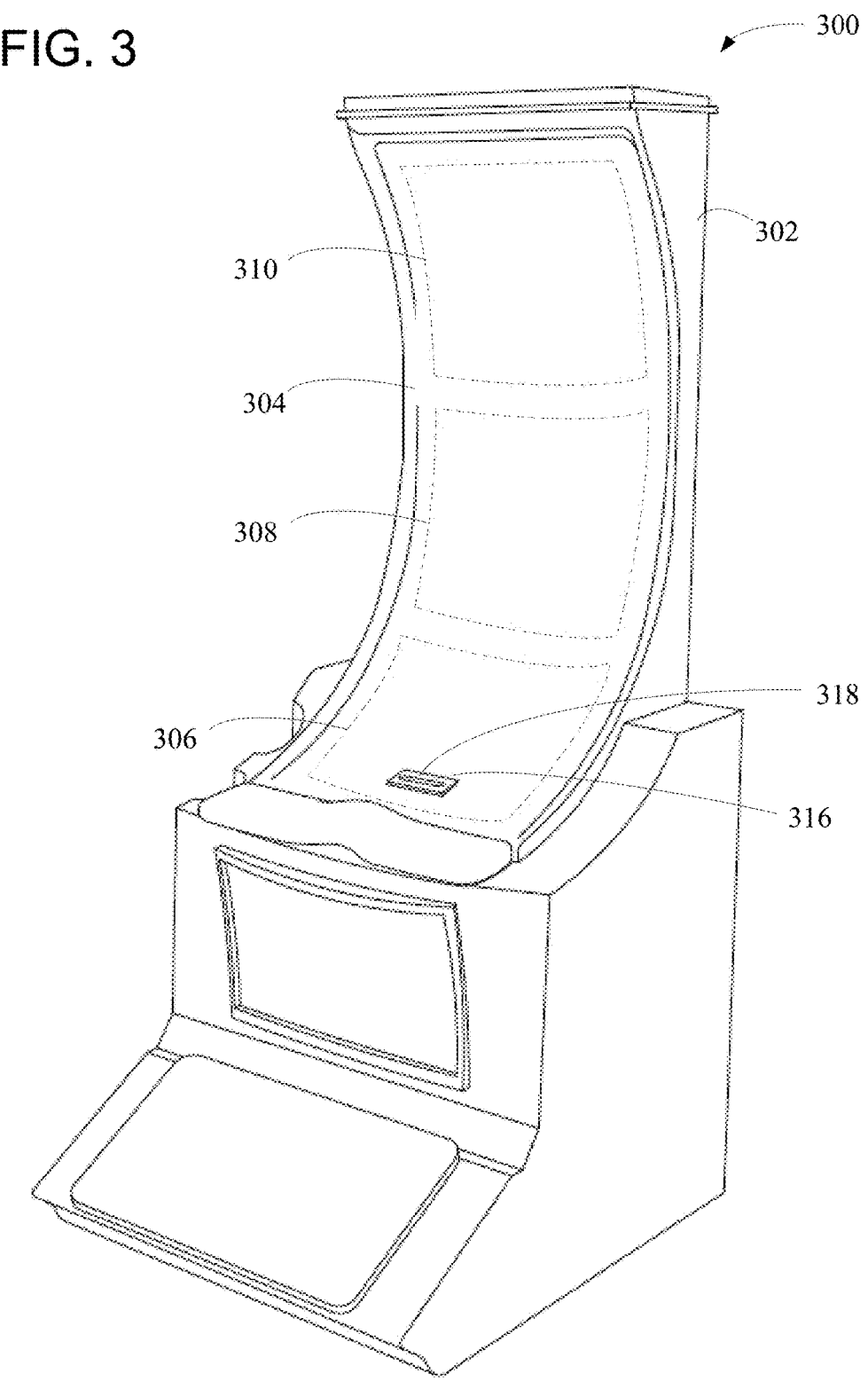
FIG. 3 is schematic diagram of an exemplary gaming machine with a curved display.

Turning now to FIG. 3, a gaming machine 300 is shown. Gaming machine 300 includes a cabinet 302 having mounted thereon a curved video display 304. Disposed within cabinet 302 are the electronics necessary to operate display 304, any user interfaces, as well as computer processors required to operate gaming machine 300. Curved video display 304 is convexly curved, and at its lower portion, presents a player interface 306 proximate a middle portion (e.g., a main display 308) and at an upper portion (e.g., a secondary display 310). Curved video display 304 may be a flexible film display, such as a color OLED display. Curved video display 304 may be a single flexible OLED display or a plurality of flexible displays configured to present a continuous curvature from player interface 306 to secondary display 310. In one embodiment, curved video display 304 may be a single display that includes separate contiguous elements. In another embodiment, one or more rear projectors project images directly on curved video display 304.

As shown in FIG. 3, curved video display 304 is curved convexly to define a continuous arc about, for example, a focus point (not shown). The focus point may be proximate a position of the eyes of an average sized user/player or above and behind the player such that player interface 306 and main display 308 are positioned as desired. Curved video display 304 could likewise be curved but defined by a plurality of foci inasmuch as curved video display 304 is flexible. For example, curved video display 304 may be curved as needed to best integrate the functions of player interface 306, main display 308, and secondary display 310. In one embodiment, curved video display 304 may be actively controlled to adjust its shape in real time based on a triggering event, such as, player input, a particular game being displayed, player characteristics (e.g., a height of a player), gaming events, and the like.

In one embodiment, player interface 306 enables a player to interact with a game presented on main display 308 and/or secondary display 310 by enabling player to place a wager, select pay lines, pick a bonus option, initiate a bonus, and the like, main display 308 displays a primary game, and secondary display 310 displays a secondary game (e.g., a bonus game). While player interface 306, main display 308, and secondary display 310 are shown in FIG. 3 with a separation there between, in one embodiment, player interface 306 may extend to main display 308, and main display 308 may extend to secondary display 310. In one embodiment, player interface 306 may be positioned above or to a side of main display 308. In another embodiment, curved video display 304 may be configured by a player (either manually, or automatically based upon some stored preferences) to adjust a size and location of player interface 306, main display 308, secondary display 310, as well as other display elements, such as credits, player inputs, rules of a game, an amount wagered, and the like.

In one embodiment, player interface 306 is positioned before the player in a 'portrait mode'. As used herein, portrait mode refers to a structural configuration of gaming machine 300 where player interface 306 is positioned such that a longer axis of player interface 306 is substantially vertical whereas a shorter axis of player interface 306 is substantially horizontal. In another embodiment, player interface 306 is positioned before the player in a 'landscape mode'. As used herein, landscape mode refers to a structural configuration of gaming machine 300 where player interface 306 is positioned such that a longer axis of player interface 306 is substantially horizontal whereas a shorter axis of player interface 306 is substantially vertical.

Player interface 306 is configured to have a touch screen or gesture based interface. In one embodiment, main display 308 and secondary display 310 are also configured to have a touch screen or gesture based interface). The touch screen interface may be any touch sensitive input device such as resistive, surface acoustic wave, capacitive (including surface capacitance and projected capacitance), force panel technology, and/or optical imaging. Player interface 306 may include a virtual button deck (not shown) that is coordinated with the input capabilities of a touch and/or gesture driven sensing used to sense player input. By touching or making the requisite gesture at a button, the player can interface with the game operated on gaming machine 300 such as making a wager, selecting the pay lines to wager upon, selecting bonus options, cashing out or selecting a denomination for play. In a related embodiment, player interface 306 may include other input and output devices including, without limitation, a touchpad, a touchscreen, a joystick, a trackball, a microphone, speakers, a camera, one or more biometric sensors, and any multiples and/or combinations of the abovementioned devices.

Secondary display 310 may display game graphics, the pay table for the game or other information. Further, during the play of the game the, main display 308 and secondary display 310 may act as a single display for bonus features, to display advertising or other information, or to display video or graphics as desired by the operator. Inasmuch as there is no physical barrier between player interface 306, main display 308, and secondary display 310, content can extend uninterrupted between all three display areas. For example, displayed content may encompass player interface 306, main display 308, and secondary display 310 such as by showing video or graphics when gaming machine 300 is in an attract mode. For example, when gaming machine 300 is not in use, the entire display 304 may be used to display video and graphics such as advertising or video programming.

Curved video display 304 further includes one or more physical cutouts 316 that enable physical peripherals to be integrated seamlessly within curved video display 304. For example, cutout 316 enables a player to access a peripheral device 318 (e.g., a bill acceptor, a ticket voucher acceptor, a printer, a barcode scanner, a camera, and a player identification card reader) coupled to/embedded in cabinet 302. The number, positions, shapes, and sizes of cutouts 316 may vary as they may depend on specifications for a particular game, installation, or peripheral device requirements. In addition, cutout 316 also enables a display of graphics on curved video display 304 to extend up to and/or surrounding peripheral device 318. Graphics (e.g., static images, animations, messages) that "wrap around" cutout 316 can be controlled to turn on and off at appropriate times. In one embodiment, the graphics that are adjacent to cutout 316 are "peripheral-related" in that they provide a user with user-friendly graphics, time dependent graphics, and graphics that are sensitive to the context of a particular event, which may overlay the specific areas of curved video display 304 as a function of game events or of user's inputs. As such, curved video display 304 is a monolithic, integrated display panel that enables dynamic edge-to-edge graphics that flow around peripheral device 318 to be achieved.

In another embodiment, peripheral device 318 is part of a mounting bezel (similar to mounting bezel 208) that attaches directly to curved video display 304. In this embodiment, curved video display includes no cutout and rather interconnects with peripheral device 318 directly via the mounting bezel. More specifically, only one edge of curved video display is in contact with peripheral device 318 (rather than surrounding peripheral device 318 as in the embodiment described earlier using the cutout).

In a related embodiment, player interface 306 is a separate bezel (either physical or virtual) that is not part of curved video display 304 but attaches directly to an edge of curved video display 304 (e.g. directly below, above, to the left, or to the right of curved video display 304 while being communicatively coupled to curved video display 304). Some portion of player interface 306 may function as a virtual bezel that is reserved (e.g., for displaying graphics) while another portion holds peripheral device 318. In yet another embodiment, curved video display 304, when in landscape mode, acquires a curvilinear orientation around a player, with the mounting bezel and one or more peripheral devices 318 also placed in a curvilinear orientation around the player as well. Additionally, one or more peripheral devices 318 are collinear with the bottom edge of the screen.

For example, prior to a player inserting money/voucher into peripheral device 318, graphics, such as an animated arrow pointing to peripheral device 318, may be displayed adjacent to peripheral device 318, directing the player where money/voucher should be inserted. Thereafter, once the player inserts the money/voucher into peripheral device 318, a graphic surrounding a perimeter of cutout 316 may be initiated. For example, an animated avatar may appear next to peripheral device 318 that says "Hello there, welcome to casino XYZ! Don't forget to swipe your player tracking card to get the double promotion we have today!" The display of graphics adjacent to peripheral device 318 enables peripheral device 318 to "talk" to a player in any language and "light up" in any color to indicate the peripheral event (cash in, cash out, card swipe, and the like) because the bezels (virtual bezels) are now part of an interactive screen (e.g., player interface 306).

In another example, a user may have just won a bonus (e.g., a ticket to a show), and peripheral device 318 is printing out an appropriate voucher. Discrete graphics (e.g., flashing arrows) may thus be generated and overlaid around peripheral device 318 (e.g., a printer (virtual) bezel's opening). In addition, interactive graphics may be used. For example, a character may appear to jump out of his symbol in a game being played on main display 308, walk over to a "SPIN" button on player interface 306, and demand the player to push the button.

Figure 4:
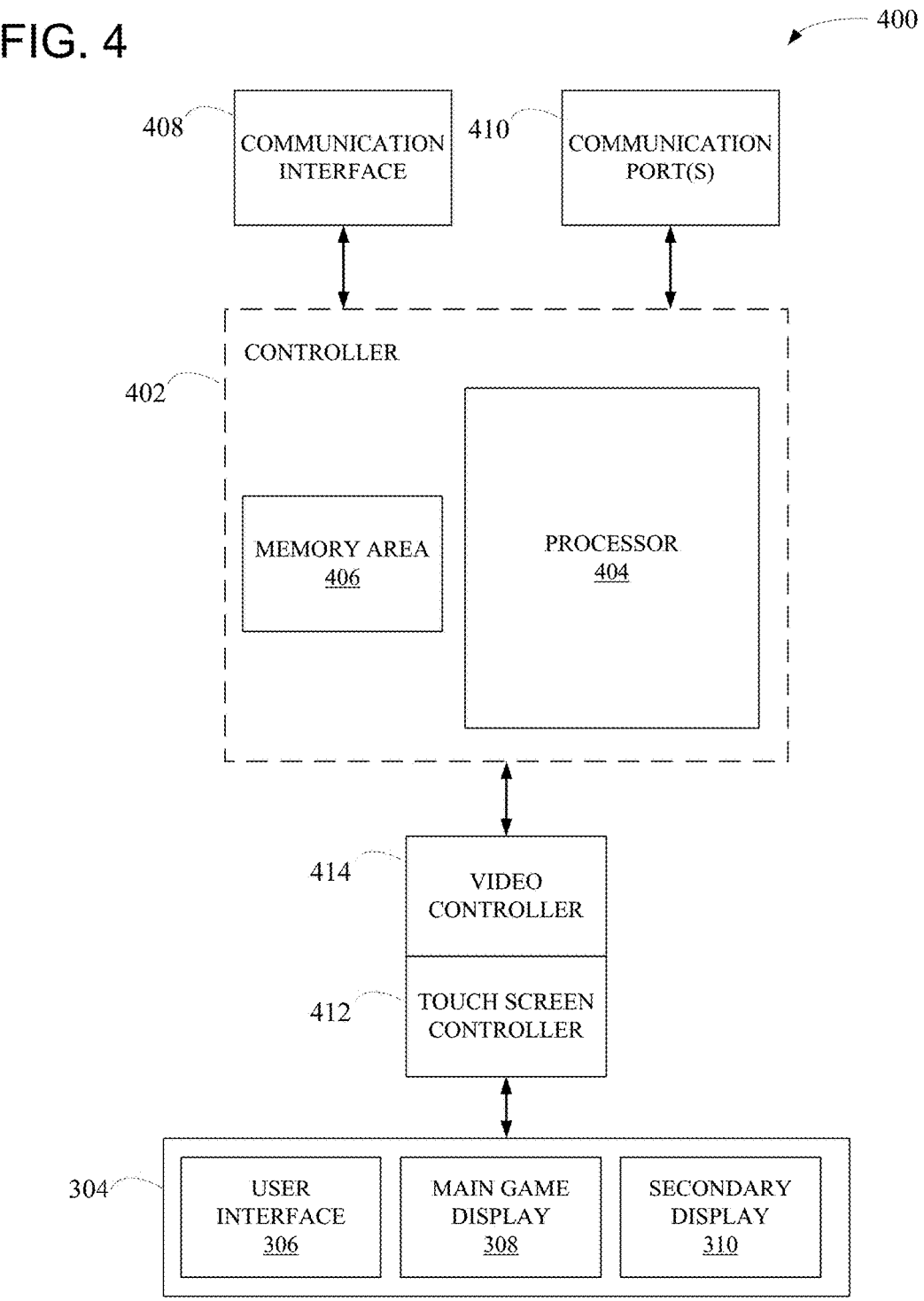
FIG. 4 is a schematic block diagram of an exemplary electrical architecture that may be used with the gaming machine shown in FIG. 3.

With reference now to FIG. 4, a schematic block diagram of an exemplary electrical architecture 400 that may be used with gaming machine 300 is shown. In the exemplary embodiment, gaming machine 300 includes a gaming machine controller 402 having a processor 404 communicatively coupled to a memory area 406. Moreover, in the exemplary embodiment, processor 404 and memory area 406 reside within cabinet 302 (shown in FIG. 3) and may be collectively referred to herein as a "computer" or "controller." Gaming machine 300 is configurable and/or programmable to perform one or more operations described herein by programming processor 404. For example, processor 404 may be programmed by encoding an operation as one or more executable instructions and providing the executable instructions in memory area 406.

Controller 402 may communicate with one or more other gaming machines or other suitable devices via a communication interface 408. Communication interface 408 may operate as an input device (e.g., by receiving data from another device) and/or as an output device (e.g., by transmitting data to another device). Processor 404 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 406 stores program code and instructions, executable by processor 404, for controlling gaming machine 300. For example, memory area 406 stores data such as image data, event data, player input data, random or pseudo-random number generation software, pay table data, trigger event conditions, game play events, game play outcomes, and/or other information or applicable game rules that relate to game play on gaming machine 300. Moreover, memory area 406 may include one or more forms of memory. For example, memory area 406 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 406 by itself or in combination. In one embodiment, the above data and program code and instructions, executable by processor 404 for enabling a player to execute a plurality of inputs using player interface 306 (shown in FIG. 3) may be stored and executed from a memory area remote from computing device gaming machine 300. For example, the data and the computer-executable instructions may be stored in a cloud service, a database, or other memory area accessible by gaming machine 300. Such embodiments reduce the computational and storage burden on gaming machine 300. As such, memory area 406 may be a local and/or a remote computer storage media including memory storage devices.

Moreover, in an exemplary embodiment, curved video display 304 (shown in FIG. 3) is controlled by controller 402. In some embodiments, one or more of player interface 306, main display 308 and secondary display 310 (shown in FIG. 3) is a touch screen associated with a touch screen controller 412. In one embodiment, the touch screen capability of player interface 306, main display 308, and secondary display 310 may be turned on and off by touch screen controller 412 based on a type of game being played, a game/information being displayed, a user preference, and other triggering events. A video controller 414 is communicatively coupled to controller 402 and touch screen controller 412 to enable a player to input game play decisions (e.g., actions) into gaming machine 300. Furthermore, gaming machine 300 includes one or more communication ports 410 that enable controller 402 to communicate with external peripheral devices (not shown) such as, but not limited to, external video sources, expansion buses, other displays, a SCSI port, or a key pad.

Figure 5:
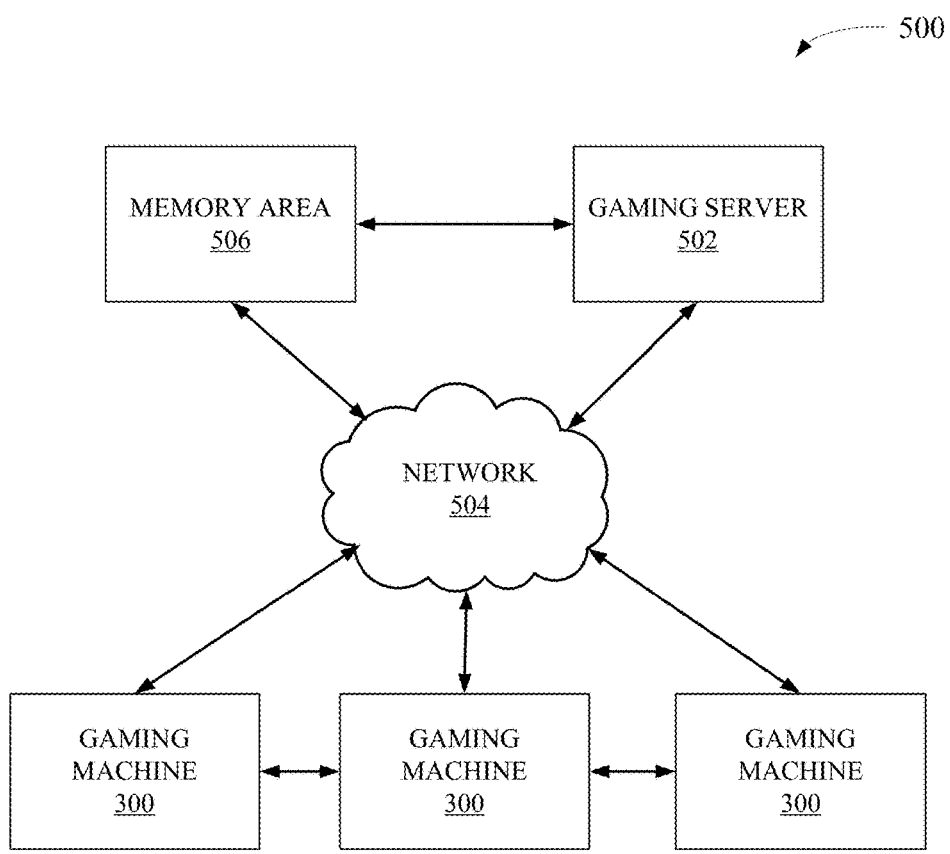
FIG. 5 is a block schematic diagram of an exemplary gaming system that includes a plurality of gaming machines shown in FIG. 3.

FIG. 5 is a block schematic diagram of an exemplary gaming system 500 that includes a plurality of gaming machines 300 (shown in FIG. 3). Each gaming machine 300 is coupled via communication interface 408 (shown in FIG. 4) to one or more servers, such as a gaming server 502, using a network 504. Gaming server 502 includes a processor (not shown) that facilitates data communication between each gaming machine 300 and other components of gaming system 500. Such data is stored in, for example, a memory area 506, such as a database, that is coupled to gaming server 502.

In one embodiment, one or more gaming machines 300 may be remote gaming machines that access a casino over network 504. In this embodiment, it will be understood that a player operating a remote gaming machine has virtual access to any casino coupled to network 504 and associated with gaming server 502. While each of gaming machines 300 may be terminal-based machines, wherein the actual games, including random number generation and/or outcome determination, are performed at gaming server each of gaming machine 300, gaming system 500 enables gaming server 502 to perform each of the these functions for gaming machines 300. In such an embodiment, gaming machines 300 display results of a game via curved video display 304 (shown in FIG. 3). Gaming server 502 may also perform a plurality of other functions including, for example, game outcome generation, executing a game play event for a player, game display functions, player tracking functions, and/or accounting functions, to name a few. However, in alternative embodiments, gaming system 500 may include a plurality of servers that separately perform these functions and/or any suitable function for use in a network-based gaming system.

In addition, gaming server 502 may also track data of players using gaming machines 300. For example, gaming server 502 can store physical characteristics of players, such as, but not limited to, a gender of a player and an age of a player. Gaming server 502 can also track and store other data related to the players using player tracking identification, such as a player card. For example, gaming server 502 can store information about a player, such as loyalty points, player address, phone number, and/or any information that may be retrieved and transmitted to gaming machines 300. In some embodiments, gaming server 502 stores and tracks information such as, but not limited to, an average amount of a wager played at gaming machines 300, any funds a player may have in an account, as well as data relating to reportable events.

Figure 6:
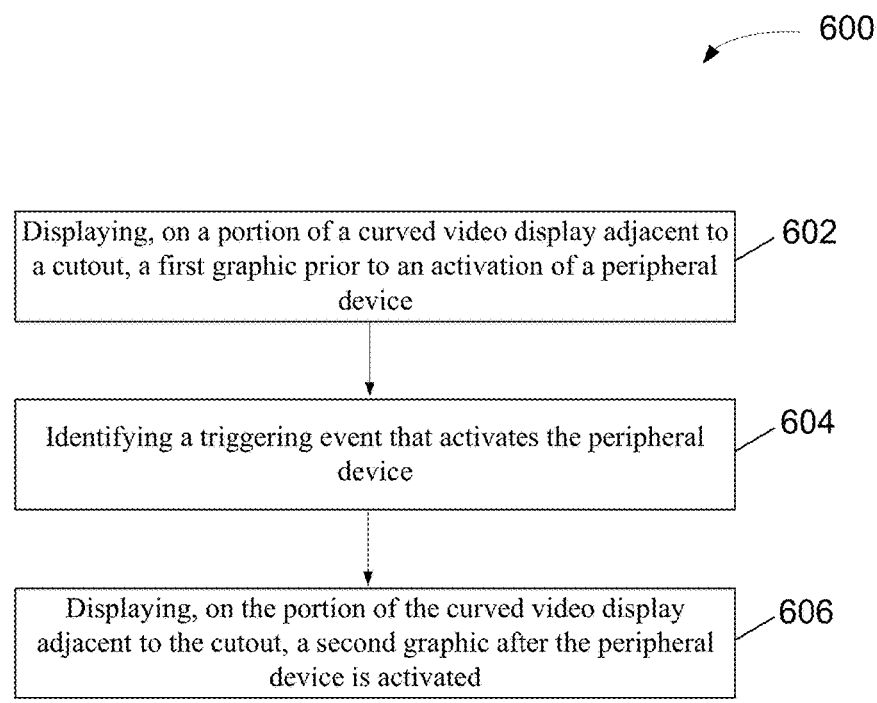
FIG. 6 is a flowchart that illustrates an exemplary method for presenting a game on a gaming machine shown in FIG. 3.

With reference now to FIG. 6, a flowchart that illustrates an exemplary method 600 for use with gaming machine 300 (shown in FIG. 3) and gaming system 500 (shown in FIG. 5) is provided. Operations in method 600 may be performed by one or more gaming machines 300, by gaming server 502, and/or by any other computing device or combination thereof. In exemplary embodiments, and referring to FIGS. 3, 4, and 5, curved video display 304 includes one or more cutouts 316 that enable physical peripherals to be integrated seamlessly within curved video display 304. For example, cutout 316 enables a player to access a peripheral device 318 (e.g., a bill acceptor, a ticket voucher acceptor, a printer, a barcode scanner, a camera, and a player identification card reader) coupled to/embedded in cabinet 302. In addition, cutout 316 also enables a display of graphics on curved video display 304 to extend up to and/or surrounding peripheral device 318. Graphics (e.g., static images, animations, messages) that "wrap around" cutout 316 can be controlled to turn on and off at appropriate times. In one embodiment, the graphics that are adjacent to cutout 316 are "peripheral-related" in that they provide a user with user-friendly graphics, time dependent graphics, and graphics that are sensitive to the context of a particular event, which may overlay the specific areas of curved video display 304 as a function of game events or of user's inputs. As such, curved video display 304 is a monolithic, integrated display panel that enables dynamic edge-to-edge graphics that flow around peripheral device 318 to be achieved.

With reference back to FIG. 6, at 602, prior to an activation of peripheral device 318, a first graphic is displayed on a portion of curved video display 304 adjacent to cutout 316. In one embodiment, the first graphic is a graphic instructing the player to insert one or more of the following into peripheral device 318: a bill, a voucher, and a player identification card. For example, prior to a player inserting money/voucher into peripheral device 318, a graphic, such as an animated arrow pointing to peripheral device 318, may be displayed adjacent to peripheral device 318, directing the player where money/voucher should be inserted.

At 604, a triggering event that activates peripheral device 318 is identified. In one embodiment, a triggering event may be an insertion of a bill, a voucher, or a player identification card into peripheral device 318. In another embodiment, a triggering event may be a lapse of a predefined period of time, a player sitting down at gaming machine 300, or a player touching curved video display 304. After peripheral device 318 is activated, at 606, a second graphic is displayed on a portion of curved video display 304 that is adjacent to cutout 316. Thus, once the player inserts money/voucher into peripheral device 318, a graphic surrounding a perimeter of cutout 316 may be initiated. For example, an animated avatar may appear next to peripheral device 318 that says "Hello there, welcome to casino XYZ! Don't forget to swipe your player tracking card to get the double promotion we have today!" The display of graphics adjacent to peripheral device 318 enables peripheral device 318 to "talk" to a player in any language and "light up" in any color to indicate the peripheral event (cash in, cash out, card swipe, and the like) because the bezels (virtual bezels) are now part of an interactive screen (e.g., player interface 306).

In another example, the triggering event that activates peripheral device 318 may be a game event, such as a user winning a bonus (e.g., a ticket to a show), and peripheral device 318 is printing out an appropriate voucher. Discrete graphics (e.g., flashing arrows) may thus be generated and overlaid around peripheral device 318 (e.g., a printer (virtual) bezel's opening). In addition, interactive graphics may be used. For example, a character may appear to jump out of his symbol in a game being played on main display 308, walk over to a "SPIN" button on player interface 306, and demand the player to push a button.

The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming machine comprising:
   a cabinet;
   a curved video display device comprising at least one display portion, the at least one display portion including an opening within the at least one display portion, wherein a peripheral device is mounted within the opening and accessible by a user of the gaming machine; and a processor programmed to display, on the at least one display portion of the curved video display device, a graphic adjacent to the peripheral device.

2. The gaming machine in accordance with claim 1, wherein the curved video display device comprises:
   a first display portion, the first display portion defining a main display for displaying a game thereon; and
   a second display portion, the second display portion defining a second display and enabling graphics associated with the peripheral device to be presented adjacent to the peripheral device.

3. The gaming machine in accordance with claim 2, wherein the second display portion is adjacent to the peripheral device, the second display portion enabling graphics associated with the peripheral device.

4. The gaming machine in accordance with claim 2, wherein the curved video display device comprises a third display portion defining a third display for displaying a secondary game thereon.

5. The gaming machine in accordance with claim 4, wherein the curved video display device comprises a fourth display portion defining a user interface display for displaying user input buttons.

6. The gaming machine in accordance with claim 1, wherein the peripheral device is one or more of the following: a bill acceptor, a ticket voucher acceptor, a printer, a barcode scanner, a camera, a player identification card reader, a physical input button, a touchpad, a touchscreen, a joystick, a trackball, a microphone, a speaker, or a biometric sensor.

7. The gaming machine in accordance with claim 1, wherein the curved video display device is configured in a landscape orientation, and wherein the peripheral device is in contact with the curved video display device in the landscape orientation.

8. The gaming machine in accordance with claim 1, wherein the processor is further programmed to:
   display a first graphic adjacent to the peripheral device prior to an activation of the peripheral device; and
   display a second graphic adjacent to the peripheral device after the peripheral device is activated.

9. The gaming machine in accordance with claim 8, wherein the processor is further programmed to:
   determine that at least one trigger condition is satisfied within a game being played using the gaming machine on the curved video display device; and
   activate the peripheral device in response to determining that the at least one trigger condition is satisfied.

10. The gaming machine in accordance with claim 1, wherein the curved video display device further comprises an edge surface, and wherein the edge surface of the curved video display device is in contact with at least one peripheral device.

11. A curved video display device, the curved video display device being communicatively coupled to a gaming machine, the gaming machine comprising a peripheral device and a processor, the curved video display device comprising:
   at least one display portion, the at least one display portion including an opening within the at least one display portion, wherein the peripheral device is mounted within the opening and accessible by a user of the gaming machine, and
   wherein the processor is programmed to display, on the at least one display portion of the curved video display device, a graphic adjacent to the peripheral device.

12. The curved video display device in accordance with claim 11, wherein the curved video display device further comprises an edge surface, and wherein the edge surface of the curved video display device is in contact with at least one peripheral device.

13. The curved video display device in accordance with claim 11, wherein the curved video display device further comprises:
   a first display portion, the first display portion defining a main display for displaying a game thereon; and
   a second display portion, the second display portion defining a second display and enabling graphics associated with the peripheral device to be presented adjacent to the peripheral device.

14. The curved video display device in accordance with claim 11, wherein the curved video display device comprises a third display portion defining a third display for displaying a secondary game of chance thereon.

15. The curved video display device in accordance with claim 11, wherein the peripheral device is one or more of the following: a bill acceptor, a ticket voucher acceptor, a printer, a barcode scanner, a camera, a player identification card reader, a physical input button, a touchpad, a touchscreen, a joystick, a trackball, a microphone, a speaker, or a biometric sensor.

16. The curved video display device in accordance with claim 11, wherein the curved video display device is configured in a landscape orientation, and wherein the peripheral device is in contact with the curved video display device in the landscape orientation.

17. The curved video display device in accordance with claim 11, further comprising:
   determining that at least one trigger condition is satisfied within a game being played using the gaming machine on the curved video display device; and
   activating the peripheral device in response to the determining.

18. A method for providing a game of chance on a gaming machine comprising a curved video display device, the curved video display device configured to be communicatively coupled to the gaming machine, the gaming machine comprising a peripheral device and a processor, the method comprising:
   displaying, on a display portion of the curved video display device, a first graphic prior to an activation of the peripheral device, wherein the display portion includes an opening, wherein the peripheral device is mounted within the opening and accessible by a user of the gaming machine, and wherein the processor is programmed to display, on the display portion of the curved video display device, a graphic adjacent to the peripheral device;
   identifying a triggering event based on a player input that activates the peripheral device; and
   displaying, on the display portion of the curved video display device, a second graphic after the peripheral device is activated.

19. The method in accordance with claim 18, wherein the first graphic is a graphic instructing the player to interact with one or more of the following: a bill acceptor, a ticket voucher acceptor, a printer, a barcode scanner, a camera, a player identification card reader, a physical input button, a touchpad, a touchscreen, a joystick, a trackball, a microphone, a speaker, or a biometric sensor.

20. The method in accordance with claim 18, wherein the curved video display device is configured in a landscape orientation, and wherein the peripheral device is in contact with the curved video display in the landscape orientation.

21. The method in accordance with claim 18, further comprising:
   determining that at least one trigger condition is satisfied within a game being played using the gaming machine on the curved video display device; and
   activating the peripheral device in response to the determining.

22. The method in accordance with claim 18, further comprising:
   displaying a first graphic adjacent to the peripheral device prior to the activation of the peripheral device; and
   displaying a second graphic adjacent to the peripheral device after the peripheral device is activated.

* * * * *